(12) United States Patent
Hao et al.

(10) Patent No.: US 10,484,921 B2
(45) Date of Patent: Nov. 19, 2019

(54) WIRELESS HOTSPOT HANDOVER METHOD, MOBILE TERMINAL AND STORAGE MEDIUM

(71) Applicant: ZTE CORPORATION, Shenzhen (CN)

(72) Inventors: Xiaojie Hao, Shenzhen (CN); Minchao Feng, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/742,311

(22) PCT Filed: Oct. 8, 2015

(86) PCT No.: PCT/CN2015/091500
§ 371 (c)(1),
(2) Date: Jan. 5, 2018

(87) PCT Pub. No.: WO2017/004902
PCT Pub. Date: Jan. 12, 2017

(65) Prior Publication Data
US 2018/0206165 A1    Jul. 19, 2018

(30) Foreign Application Priority Data

Jul. 7, 2015    (CN) .......................... 2015 1 0395889

(51) Int. Cl.
*H04W 36/18*    (2009.01)
*H04W 36/30*    (2009.01)
(Continued)

(52) U.S. Cl.
CPC ........... *H04W 36/18* (2013.01); *H04W 36/08* (2013.01); *H04W 36/30* (2013.01); *H04W 76/34* (2018.02); *H04W 84/12* (2013.01)

(58) Field of Classification Search
None
See application file for complete search history.

(56) References Cited

U.S. PATENT DOCUMENTS 7,881,718 B2    2/2011   Kurokawa
8,086,855 B2   12/2011   Katz
(Continued)

FOREIGN PATENT DOCUMENTS

CN    101322432 A    12/2008
CN    101808309 A     8/2010
(Continued)

OTHER PUBLICATIONS

International Search Report in international application No. PCT/CN2015/091500, dated Mar. 31, 2016.
(Continued)

*Primary Examiner* — Candal Elpenord
(74) *Attorney, Agent, or Firm* — Oppedahl Patent Law Firm LLC

(57) ABSTRACT

Disclosed is a wireless hotspot switching method, which is applied to a mobile terminal. The method comprises: after a mobile terminal establishes a first wireless connection with a first wireless hotspot via a first wireless module, and when it is determined that a first wireless link as a current network link meets a first pre-set condition, establishing a second wireless link with a second wireless hotspot via a second wireless module and maintaining the connection of the first wireless link, and then when it is determined that the second wireless link meets a second pre-set condition, switching a current network link to the second wireless link so as to access a network via the second wireless link. In this way, the whole switching process is transparent to a user, and the user will not feel problems, such as link disconnection, excessively slow network speed and poor network quality, due to link switching, so that seamless switching between wireless hotspots is implemented, and the fluency of network accessing during a user movement process is ensured.

(Continued)

Also provided are a mobile terminal and a storage medium at the same time.

24 Claims, 3 Drawing Sheets

(51) Int. Cl.
*H04W 36/08* (2009.01)
*H04W 76/34* (2018.01)
*H04W 84/12* (2009.01)

(56) References Cited

U.S. PATENT DOCUMENTS

| | | | | |
|---|---|---|---|---|
| 8,614,990 | B1* | 12/2013 | Mistry | H04W 36/00837 370/332 |
| 2006/0172769 | A1* | 8/2006 | Oh | H04W 36/30 455/557 |
| 2006/0291455 | A1 | 12/2006 | Katz | |
| 2008/0014945 | A1 | 1/2008 | Kurokawa | |
| 2008/0069065 | A1* | 3/2008 | Wu | H04W 36/08 370/340 |
| 2009/0316658 | A1* | 12/2009 | Kin | H04W 36/30 370/332 |
| 2010/0075676 | A1* | 3/2010 | Hyziak | H04W 36/30 455/436 |
| 2011/0019641 | A1* | 1/2011 | Chang | H04W 36/005 370/331 |
| 2013/0077482 | A1* | 3/2013 | Krishna | H04W 36/22 370/230 |
| 2013/0237226 | A1* | 9/2013 | Periyalwar | H04W 88/06 455/436 |
| 2014/0153489 | A1* | 6/2014 | Perras | H04W 60/00 370/328 |
| 2014/0162659 | A1* | 6/2014 | Aminaka | H04W 36/14 455/437 |
| 2015/0036662 | A1 | 2/2015 | Chen et al. | |
| 2015/0117399 | A1 | 4/2015 | Yang et al. | |
| 2015/0117414 | A1 | 4/2015 | Tang et al. | |
| 2015/0282033 | A1 | 10/2015 | Lunden et al. | |
| 2015/0373610 | A1 | 12/2015 | Zhi et al. | |
| 2016/0234749 | A1* | 8/2016 | Singh | H04W 36/0022 |
| 2016/0360462 | A1* | 12/2016 | Chockalingam | H04W 36/30 |
| 2019/0059052 | A1* | 2/2019 | Nord | H04W 36/14 |

FOREIGN PATENT DOCUMENTS

| | | |
|---|---|---|
| CN | 103369613 A | 10/2013 |
| CN | 103973365 A | 8/2014 |
| CN | 104254063 A | 12/2014 |
| CN | 204258839 U | 4/2015 |
| CN | 104602308 A | 5/2015 |
| EP | 1883186 A1 | 1/2008 |
| WO | 2014065828 A1 | 5/2014 |

OTHER PUBLICATIONS

English Translation of the Written Opinion of the International Search Authority in international application No. PCT/CN2015/091500, dated Mar. 31, 2016.

Supplementary European Search Report in European application No. 15897558.1, dated Apr. 20, 2018.

* cited by examiner

WIRELESS HOTSPOT HANDOVER METHOD, MOBILE TERMINAL AND STORAGE MEDIUM

TECHNICAL FIELD

The disclosure relates to a wireless communication technology, and particularly to a wireless hotspot handover method, a mobile terminal and a storage medium.

BACKGROUND

At present, people use a wireless network connection function of terminals such as smart phones, tablet computers and smart televisions in daily lives, and may access wireless networks after the terminals are connected to wireless hotspots such as Wireless Fidelity (Wi-Fi) hotspots through wireless modules such as Wi-Fi modules.

In order to make it convenient for a user to access a wireless network anytime anywhere, many operating companies may lay out own wireless network Access Points (APs) all over the country, and then, a terminal of the user may be connected to a Wi-Fi hotspot to access the network at a place A, and may be connected to another Wi-Fi hotspot to continue accessing the network after arriving at a place B. However, when the user moves among different hotspots, there may exist a phenomenon of network non-fluency and even disconnection at positions of boundaries of network coverage edges of the hotspots, which seriously influences user experiences.

SUMMARY

Embodiments of the disclosure are expected to provide a wireless hotspot handover method, a mobile terminal and a storage medium, so as to implement seamless handover between wireless hotspots, ensure network access fluency of a user in a movement process and improve user experiences.

The technical solutions of the disclosure are implemented as follows.

In a first aspect, the embodiments of the disclosure provide a wireless hotspot handover method, which may be applied to a mobile terminal including a first wireless module and a second wireless module. The method includes: when it is determined that a first wireless link serving as a current network link meets a first preset condition, a second wireless link is established with a second wireless hotspot through the second wireless module, and the first wireless link is kept connected, herein the first wireless link may be established by the mobile terminal with a first wireless hotspot through the first wireless module; and when it is determined that the second wireless link meets a second preset condition, the current network link is handed over from the first wireless link to the second wireless link so that a network is accessed through the second wireless link.

In an embodiment, the operation that it is determined that the first wireless link serving as the current network link meets the first preset condition may include that: signal strength of the first wireless link is detected; and when the signal strength of the first wireless link is less than or equal to a first preset threshold value, it is determined that the first wireless link meets the first preset condition.

In an embodiment, the operation that it is determined that the second wireless link meets the second preset condition may include that: the signal strength of the first wireless link and signal strength of the second wireless link are detected; and when a difference between the signal strength of the first wireless link and the signal strength of the second wireless link is larger than a second preset threshold value, it is determined that the second wireless link meets the second preset condition.

In an embodiment, the operation that it is determined that the second wireless link meets the second preset condition may include that: the signal strength and link performance of the first wireless link and the signal strength and link performance of the second wireless link are detected; and when the difference between the signal strength of the first wireless link and the signal strength of the second wireless link is larger than the second preset threshold value and the link performance of the second wireless link is higher than the link performance of the first wireless link, it is determined that the second wireless link meets the second preset condition.

In an embodiment, the operation that the second wireless link is established with the second wireless hotspot through the second wireless module may include that: the second wireless module is controlled to operate to automatically load configuration information and perform hotspot scanning; and when the second wireless hotspot matched with the configuration information is scanned, the second wireless hotspot is attempted to be connected, and after successful connection, the second wireless link is established.

In an embodiment, the method may further include that: after the network is accessed through the second wireless link, stability of the second wireless link is detected; when the second wireless link is kept stable for a preset time length, the first wireless link is controlled to be disconnected, and operation of the first wireless module is stopped; when the second wireless link is not kept stable for the preset time length and a link disconnection occurs to the second wireless link, the current network link is controlled to be handed over from the second wireless link back to the first wireless link; and when the second wireless link is not kept stable for the preset time length and the link disconnection does not occur to the second wireless link, the stability of the second wireless link is continued to be detected until the stability is kept for the preset time length.

In a second aspect, the embodiments of the disclosure provide a mobile terminal, which may include: a first wireless module arranged to be connected with a first wireless hotspot and establish a first wireless link; a second wireless module arranged to be connected with a second wireless hotspot and establish a second wireless link; and a hotspot handover control module arranged to, when it is determined that the first wireless link serving as a current network link meets a first preset condition, control the second wireless module to operate to establish the second wireless link with the second wireless hotspot and keep the first wireless link connected, and when it is determined that the second wireless link meets a second preset condition, hand over the current network link from the first wireless link to the second wireless link so that a network is accessed through the second wireless link.

In an embodiment, the mobile terminal may further include: a detection module arranged to detect signal strength of the first wireless link; and correspondingly, the hotspot handover control module may further be arranged to, when the signal strength of the first wireless link is less than or equal to a first preset threshold value, determine that the first wireless link meets the first preset condition.

In an embodiment, the mobile terminal may further include: a detection module arranged to detect the signal strength of the first wireless link and signal strength of the second wireless link; and correspondingly, the hotspot handover control module may further be arranged to, when a difference between the signal strength of the first wireless link and the signal strength of the second wireless link is larger than a second preset threshold value, determine that the second wireless link meets the second preset condition.

In an embodiment, the mobile terminal may further include: a detection module arranged to detect the signal strength and link performance of the first wireless link and the signal strength and link performance of the second wireless link; and correspondingly, the hotspot handover control module may further be arranged to, when the difference between the signal strength of the first wireless link and the signal strength of the second wireless link is larger than the second preset threshold value and the link performance of the second wireless link is higher than the link performance of the first wireless link, determine that the second wireless link meets the second preset condition.

In an embodiment, the hotspot handover control module may further be arranged to control the second wireless module to operate; and correspondingly, the second wireless module may further be arranged to automatically load configuration information, perform hotspot scanning, when the second wireless hotspot matched with the configuration information is scanned, attempt to connect the second wireless hotspot, and after successful connection, establish the second wireless link.

In an embodiment, the mobile terminal may further include: a detection module arranged to, after the mobile terminal accesses the network through the second wireless link, detect stability of the second wireless link; and the hotspot handover control module may further be arranged to, when the second wireless link is kept stable for a preset time length, control the first wireless link to be disconnected, stop operation of the first wireless module, when the second wireless link is not kept stable for the preset time length and a link disconnection occurs to the second wireless link, control the current network link to be handed over from the second wireless link back to the first wireless link, and when the second wireless link is not kept stable for the preset time length and the link disconnection does not occur to the second wireless link, control the detection module to continue detecting the stability of the second wireless link until the stability is kept for the preset time length.

The embodiments of the disclosure provide the wireless hotspot handover method, the mobile terminal and the storage medium. The mobile terminal includes the first wireless module and the second wireless module; and after the mobile terminal establishes a first wireless connection with the first wireless hotspot through the first wireless module, the mobile terminal establishes the second wireless link with the second wireless hotspot through the second wireless module and keeps the first wireless link connected when determining that the first wireless link serving as the current network link meets the first preset condition, and when determining that the second wireless link meets the second preset condition, hands over the current network link from the first wireless link to the second wireless link to access the network through the second wireless link. Thus it can be seen that the whole handover process is transparent to a user, the user may not feel the problems of link disconnection, excessively low network speed, poor network quality and the like brought by link handover, and seamless handover between the wireless hotspots is really implemented; and moreover, the current network link of the mobile terminal is handed over to the second wireless link of which the link performance is higher than the first wireless link, so that network access fluency of the user in a movement process is ensured, and user experiences are improved.

DETAILED DESCRIPTION

The technical solutions in the embodiments of the disclosure will be clearly and completely described below in combination with the drawings in the embodiments of the disclosure.

The embodiments of the disclosure provide a wireless hotspot handover method, which is applied to a mobile terminal, and the mobile terminal may be a smart phone, a tablet computer, wearable equipment, a multimedia player and the like. The mobile terminal includes a first wireless module and a second wireless module, herein the mobile terminal may establish a first wireless link with a first wireless hotspot through the first wireless module, and the mobile terminal may establish a second wireless link with a second wireless hotspot through the second wireless module.

Furthermore, the mobile terminal, the first wireless hotspot and the second wireless hotspot may be included in a wireless communication system.

Figure 1:
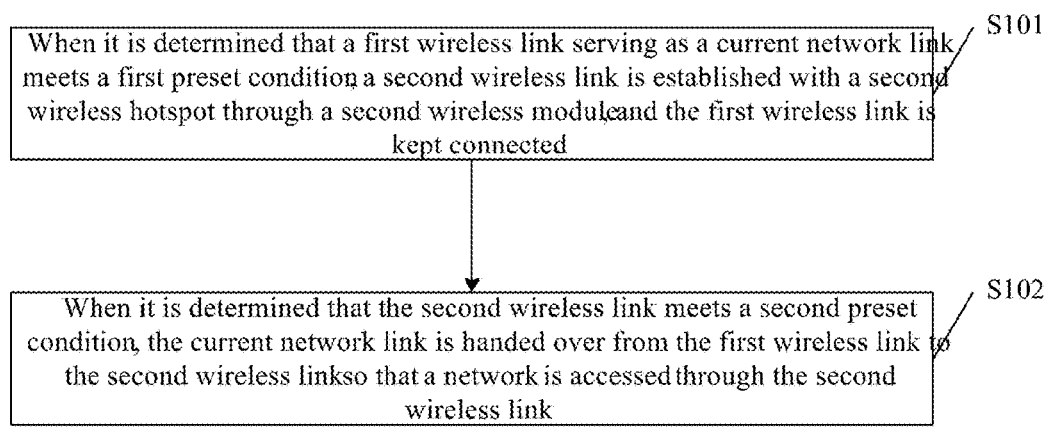
FIG. 1 is a flowchart of a wireless hotspot handover method according to an embodiment of the disclosure.

Then, referring to FIG. 1, the method includes the following steps.

In S101, when it is determined that the first wireless link serving as a current network link meets a first preset condition, the second wireless link is established with the second wireless hotspot through the second wireless module, and the first wireless link is kept connected.

Specifically, the mobile terminal only establishes the first wireless link with the first wireless hotspot through the first wireless module, and at this moment, the mobile terminal is in a single-module working mode. Along with movement of a user, the mobile terminal moves to an edge of a coverage area of the first wireless hotspot, in such a movement process, the mobile terminal detects signal strength of the first wireless link, and when the signal strength of the first wireless link is less than or equal to a first preset threshold value, determines that the first wireless link meets the first preset condition, and then the mobile terminal establishes the second wireless link with the second wireless hotspot through the second wireless module, that is, when the signal strength of the first wireless link is less than or equal to the first preset threshold value, the second wireless module is controlled to operate to automatically load a configuration file and start a scanning mechanism for hotspot scanning, and once a hotspot, i.e. the second wireless hotspot, matched with configuration information is scanned, the second wireless hotspot is automatically attempted to be connected, and after successful connection, the second wireless link is established. In such a process of establishing the second wireless link, the first wireless link is kept connected all the time, and then, after the second wireless link is established, the mobile terminal in a double-module working mode. When a signal strength value of the first wireless link is larger than the first preset threshold value, the signal strength of the first wireless link is continued to be detected until the signal strength value is less than or equal to the first threshold value.

The signal strength mentioned here refers to a Received Signal Strength Indication (RSSI), and the signal strength value may reflect quality of the link.

During a practical application, the first threshold value may be −90 dbm, and of course, may also be another value, which is determined by a specific network layout condition of an operating company and will not be specifically limited in the disclosure.

Furthermore, the configuration file may include the configuration information such as a Service Set Identifier (SSID), encryption manner and password information of the second wireless hotspot.

In S102, when it is determined that the second wireless link meets a second preset condition, the current network link is handed over from the first wireless link to the second wireless link so that a network is accessed through the second wireless link.

Specifically, the mobile terminal may simultaneously detect the signal strength of the first wireless link and the signal strength of the second wireless link after entering the double-module working mode through S101, then the mobile terminal may calculate a difference between the signal strength of the first wireless link and the signal strength of the second wireless link, and determines that the second wireless link meets the second preset condition when the difference between the signal strength of the first wireless link and the signal strength of the second wireless link is larger than a second preset threshold value, at this moment, the mobile terminal may hand over the current network link from the first wireless link to the second wireless link in a network layer, to complete handover of the wireless hotspots, and at this moment, the mobile terminal is recovered into the single-module working mode. However, if the difference between the signal strength of the first wireless link and the signal strength of the second wireless link is less than or equal to the second preset threshold value, it is indicated that link quality of the second wireless link is not so high, and at this moment, the signal strength of the first wireless link and the second wireless link is continued to be detected until the difference between the signal strength of the first wireless link and the signal strength of the second wireless link is larger than the second preset threshold value.

During a practical application, the second preset threshold value may be set to be 3 dbm, and of course, may also be 4 dbm, 5 dbm, 7 dbm and the like, which is determined by the practical application and will not be specifically limited in the disclosure.

In another embodiment, the step that it is determined that the second wireless link meets the second preset condition in S102 may further include that: the signal strength and link performance of the first wireless link and the signal strength and link performance of the second wireless link are detected; and when the difference between the signal strength of the first wireless link and the signal strength of the second wireless link is larger than the second preset threshold value and the link performance of the second wireless link is higher than the link performance of the first wireless link, it is determined that the second wireless link meets the second preset condition. If any condition is not met, detection is continued until it is met.

During a practical application, the mobile terminal in the double-module working mode may simulate a packet sending manner of a network and make statistics on sent data packet numbers, received data packet numbers, information about time from data packet sending to data packet receiving and the like of the two wireless links to calculate respective network delays, throughputs, packet loss rates and the like to represent the link performance of the first wireless link and the link performance of the second wireless link respectively. Of course, the link performance of the first wireless link and the link performance of the second wireless link may also be represented by other network parameters, which will not be specifically limited in the disclosure.

In a specific implementation process, in order to ensure communication reliability, after S102, the method may further include that: after the network is accessed through the second wireless link, stability of the second wireless link is detected; when the second wireless link is kept stable for a preset time length, the first wireless link is controlled to be disconnected, and operation of the first wireless module is stopped; when the second wireless link is not kept stable for the preset time length and a link disconnection occurs to the second wireless link, the current network link is controlled to be handed over from the second wireless link back to the first wireless link; and when the second wireless link is not kept stable for the preset time length and the link disconnection does not occur to the second wireless link, the stability of the second wireless link is continued to be detected until the stability is kept for the preset time length.

Specifically, the mobile terminal is required to detect the stability of the second wireless link, and if the second wireless link keep the network fluent or ensure that network performance does not get poor within the preset time length, at this moment, the first wireless link may be controlled to be disconnected, and operation of the first wireless module is stopped; if the circumstance that the second wireless link is unstable when the preset time length is not reached and if the second wireless link has been disconnected, the mobile terminal may use the first wireless link as the current network link as a default, that is, the current network link is handed over from the second wireless link back to the first wireless link; and if the second wireless link is not disconnected, the mobile terminal may keep detecting the stability of the second wireless link and disconnect the first wireless link when the second wireless link is kept stable for the preset time length. In such a manner, influence of handover of the wireless hotspots on user experiences may further be avoided. Furthermore, since the circumstance that the signal strength of the first wireless link is higher than the signal strength of the second wireless link occasionally occurs only at a boundary moment of network handover, along with movement of the user, the signal strength of the second wireless link may get higher than the signal strength of the first wireless link soon, and the second wireless link may get stable soon.

After the mobile terminal accesses the network through the second wireless link for the preset time length, that is, it is determined that the second wireless link gets stable, the first wireless link is controlled to be disconnected, and operation of the first wireless module is stopped. The preset time length mentioned here may be 30 seconds, 1 minute, 2 minutes and the like, which will not be specifically limited in the disclosure.

The embodiments of the disclosure further disclose a computer-readable storage medium, which includes a set of instructions, the instructions being arranged to execute the abovementioned wireless hotspot handover method.

The abovementioned method will be described below in detail.

Figure 2:
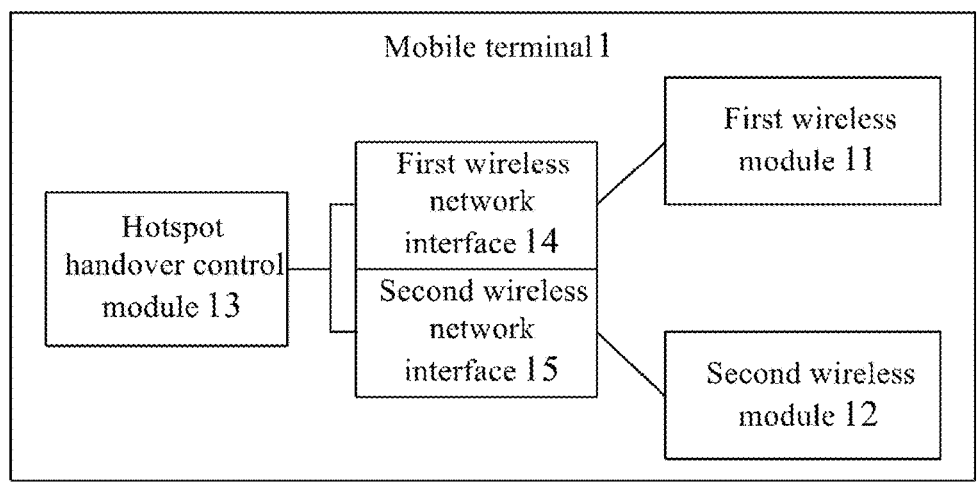
FIG. 2 is a structure diagram of a mobile terminal according to an embodiment of the disclosure.

Referring to FIG. 2, a mobile terminal 1 includes: a first wireless module 11 arranged to be connected with a first wireless hotspot and establish a first wireless link L1; a second wireless module 12 arranged to be connected with a second wireless hotspot and establish a second wireless link L2; a hotspot handover control module 13 arranged to, when it is determined that L1 serving as a current network link meets a first preset condition, control the second wireless module 12 to operate to establish L2 with the second wireless hotspot and keep L1 connected, and when it is determined that L2 meets a second preset condition, hand over the current network link from L1 to L2 to access a network through L2; and a detection module 14 arranged to detect signal strength of L1 and L2 and further arranged to detect link performance of L1 and L2.

During a practical application, the mobile terminal further includes a first wireless network interface 14 and a second wireless network interface 15, for example, a Wireless Local Area Network 1 (WLAN1) interface and a WLAN2 interface, the first wireless module 11 corresponds to the first wireless network interface 14, and the second wireless module 12 corresponds to the second wireless network interface 15.

Furthermore, the two wireless modules may be implemented through double chips, one module corresponding to one chip, and may also be implemented by a method of simulating double chips on a single chip, for example, another WLAN port is virtualized by simulating a manner of Wi-Fi Station (STA) and Wi-Fi Peer to Peer (P2P) concurrence and a virtual double-chip working mode is implemented in a Time Division Duplexing (TDD) manner. Of course, another implementation mode may further be adopted, which is determined by the practical application and will not be specifically limited in the disclosure.

In the embodiments of the disclosure, the two wireless modules are implemented in a double-chip manner, the first wireless module is a Wi-Fi chip P1, the second wireless module is a Wi-Fi chip P2, P1 corresponds to the Wi-Fi interface WLAN1, and P2 corresponds to the Wi-Fi interface WLAN2. In addition, a first wireless hotspot is an AP1, and a second wireless hotspot is an AP2.

Then, the abovementioned method will be described in combination with the abovementioned mobile terminal.

At first, a current state of the mobile terminal is that the hotspot handover control module only controls WLAN1 to invoke P1 to operate and be connected with AP1 through L1, and at this moment, the mobile terminal is in a single-chip working mode.

Figure 3:
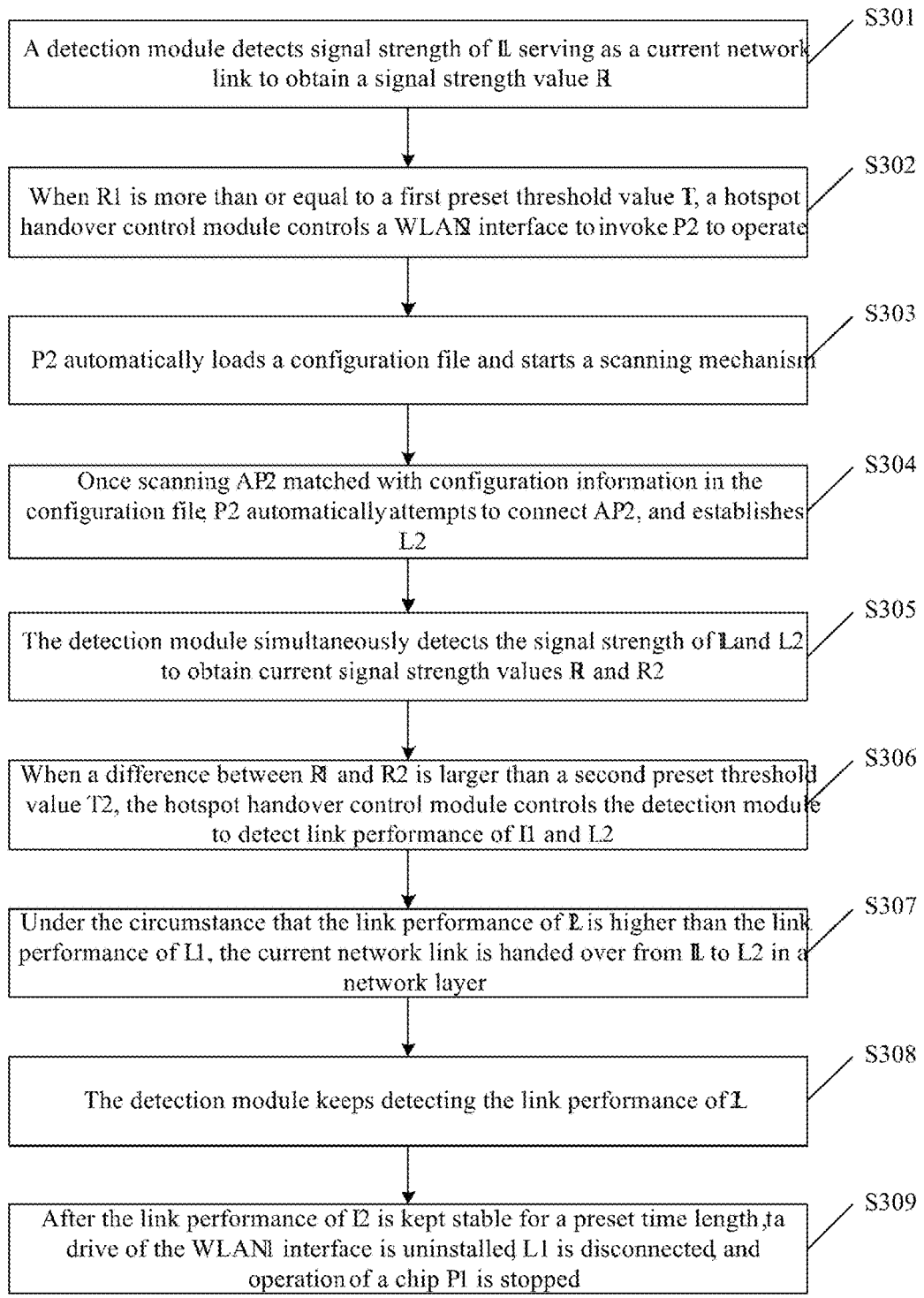
FIG. 3 is a flowchart of another wireless hotspot handover method according to an embodiment of the disclosure.

Then, along with movement of a user, the mobile terminal moves to an edge of a coverage area of AP1, and in this process, the abovementioned handover method is executed. Referring to FIG. 3, the method includes the following steps.

In S301, the detection module detects the signal strength of L1 serving as the current network link to obtain a signal strength value R1.

In S302, when R1 is more than or equal to a first preset threshold value T1, the hotspot handover control module controls the WLAN2 interface to invoke P2 to operate.

In S303, P2 automatically loads a configuration file and starts a scanning mechanism.

In S304, once scanning AP2 matched with configuration information in the configuration file, P2 automatically attempts to connect AP2, and establishes L2.

At this moment, the mobile terminal is in a double-chip working mode, that is, P1 and P2 simultaneously work.

In S305, the detection module simultaneously detects the signal strength of L1 and L2 to obtain current signal strength values R1 and R2.

In S306, when a difference between R1 and R2 is larger than a second preset threshold value T2, the hotspot handover control module controls the detection module to detect the link performance of L1 and L2.

In S307, under the circumstance that the link performance of L2 is higher than the link performance of L1, the hotspot handover control module hands over the current network link from L1 to L2 in a network layer.

In such a manner, the mobile terminal may access the network through P2.

In S308, the detection module keeps detecting the link performance of L2.

In S309, after the link performance of L2 is kept stable for a preset time length t, the hotspot handover control module uninstalls a drive of the WLAN1 interface, disconnects L1 and stops operation of the chip P1.

It is important to note that both P1 and P2 of the mobile terminal work in a process of executing S305 to S308, and after S309, only P2 of the mobile terminal works and the mobile terminal is recovered into the single-chip working mode.

From the above, it can be seen that the whole wireless hotspot handover process is transparent to the user, the user may not feel the problems of link disconnection, excessively low network speed, poor network quality and the like brought by link handover, and seamless handover between the wireless hotspots is really implemented; and moreover, the current network link of the mobile terminal is handed over to the second wireless link of which the link performance is higher than the first wireless link, so that network access fluency of the user in a movement process is ensured, and user experiences are improved. Furthermore, after handover is completed, the mobile terminal returns to an ordinary single-module working mode and gets ready for subsequent handover.

The embodiments of the disclosure further provide a mobile terminal. Consistent with the mobile terminal mentioned in the abovementioned one or more embodiments, referring to FIG. 2, the mobile terminal 1 includes: a first wireless module 11 arranged to be connected with a first wireless hotspot and establish a first wireless link; a second wireless module 12 arranged to be connected with a second wireless hotspot and establish a second wireless link; and a hotspot handover control module 13 arranged to, when it is determined that the first wireless link serving as a current network link meets a first preset condition, control the second wireless module 12 to operate to establish the second wireless link with the second wireless hotspot and keep the first wireless link connected, and when it is determined that the second wireless link meets a second preset condition, hand over the current network link from the first wireless link to the second wireless link so that a network is accessed through the second wireless link.

During a practical application, the mobile terminal further includes a first wireless network interface 14 and a second wireless network interface 15, for example, a WLAN1 interface and a WLAN2 interface, the first wireless module 11 corresponds to the first wireless network interface 14, and the second wireless module corresponds to the second wireless network interface 15.

Furthermore, the first wireless module 11 and the second wireless module 12 may be implemented in a double-chip manner, one module corresponding to one chip, and may also be implemented by a method of simulating double chips on a single chip, for example, another WLAN port is virtualized by simulating a manner of Wi-Fi STA and Wi-Fi P2P concurrence and a virtual double-chip working mode is implemented in a TDD manner. Of course, another implementation mode may further be adopted, which is determined by the practical application and will not be specifically limited in the disclosure.

In an embodiment, the mobile terminal 1 further includes: a detection module arranged to detect signal strength of the first wireless link; and correspondingly, the hotspot handover control module 13 is further arranged to, when the signal strength of the first wireless link is less than or equal to a first preset threshold value, determine that the first wireless link meets the first preset condition.

In an embodiment, the mobile terminal 1 further includes: a detection module arranged to detect the signal strength of the first wireless link and signal strength of the second wireless link; and correspondingly, the hotspot handover control module is further arranged to, when a difference between the signal strength of the first wireless link and the signal strength of the second wireless link is larger than a second preset threshold value, determine that the second wireless link meets the second preset condition.

In an embodiment, the mobile terminal 1 further includes: a detection module arranged to detect the signal strength and link performance of the first wireless link and the signal strength and link performance of the second wireless link; and correspondingly, the hotspot handover control module 13 is further arranged to, when the difference between the signal strength of the first wireless link and the signal strength of the second wireless link is larger than the second preset threshold value and the link performance of the second wireless link is higher than the link performance of the first wireless link, determine that the second wireless link meets the second preset condition.

In an embodiment, the hotspot handover control module 13 is further arranged to control the second wireless module 12 to operate; and correspondingly, the second wireless module 12 is further arranged to automatically load configuration information, perform hotspot scanning, when the second wireless hotspot matched with the configuration information is scanned, attempt to connect the second wireless hotspot, and after successful connection, establish the second wireless link.

In an embodiment, the mobile terminal 1 further includes: a detection module arranged to, after the mobile terminal 1 accesses the network through the second wireless link, detect stability of the second wireless link; and the hotspot handover control module 13 is further arranged to, when the second wireless link is kept stable for a preset time length, control the first wireless link to be disconnected, stop the first wireless module 11 to operate, when the second wireless link is not kept stable for the preset time length and a link disconnection occurs to the second wireless link, control the current network link to be handed over from the second wireless link back to the first wireless link, and when the second wireless link is not kept stable for the preset time length and the link disconnection does not occur to the second wireless link, control the detection module to continue detecting the stability of the second wireless link until the stability is kept for the preset time length.

In a specific implementation process, the hotspot handover control module 13, the first wireless network interface 14 and the second wireless network interface 15 may be arranged in the same chip, and there may also be a Radio Frequency (RF) function area, a sensor function area, a Subscriber Identity Module (SIM) card function area, a Camera function area and the like in the chip. The first wireless module 11 and the second wireless module 12 mainly access the chip for work through the first wireless network interface 14 and second wireless network interface 15 of the RF function area.

Those skilled in the art should know that the embodiment of the disclosure may be provided as a method, a system or a computer program product. Therefore, the disclosure may adopt a form of hardware embodiment, software embodiment and combined software and hardware embodiment. Moreover, the disclosure may adopt a form of computer program product implemented on one or more computer-available storage media (including, but not limited to, a disk memory and an optical memory) including computer-available program codes.

The disclosure is described with reference to flowcharts and/or block diagrams of the method, equipment (system) and computer program product according to the embodiment of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or the other programmable data processing equipment to operate in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing equipment, so that a series of operating steps are executed on the computer or the other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

The above is only the preferred embodiment of the disclosure and not intended to limit the scope of protection of the disclosure.

INDUSTRIAL APPLICABILITY

According to the embodiments of the disclosure, after the mobile terminal establishes the first wireless connection with the first wireless hotspot through the first wireless module, the mobile terminal establishes the second wireless link with the second wireless hotspot through the second wireless module and keeps the first wireless link connected when determining that the first wireless link serving as the current network link meets the first preset condition, and when determining that the second wireless link meets the second preset condition, hands over the current network link from the first wireless link to the second wireless link to access the network through the second wireless link. Thus it can be seen that the whole handover process is transparent to the user, the user may not feel the problems of link disconnection, excessively low network speed, poor network quality and the like brought by link handover, and seamless handover between the wireless hotspots is really implemented; and moreover, the current network link of the mobile terminal is handed over to the second wireless link of which the link performance is higher than the first wireless link, so that the network access fluency of the user in the movement process is ensured, and the user experiences are improved.

The invention claimed is:

1. A wireless hotspot handover method, applied to a mobile terminal operating in a double-chip manner and comprising a first wireless module and a second wireless module, wherein the first wireless module and the second wireless module are implemented through double chips, the first wireless module and the second wireless module each being a Wi-Fi chip, the method comprising:
when it is determined that a first wireless link serving as a current network link meets a first preset condition, establishing a second wireless link with a second wireless hotspot through the second wireless module, and keeping the first wireless link connected, wherein the first wireless link is established by the mobile terminal with a first wireless hotspot through the first wireless module; and
when it is determined that the second wireless link meets a second preset condition, handing over the current network link from the first wireless link to the second wireless link so that a network is accessed through the second wireless link to implement seamless handover between wireless hotspots through the double-chip manner;
the method further comprising:
after the current network link is handed over from the first wireless link to the second wireless link, detecting stability of the second wireless link.

2. The method according to claim 1, wherein determining that the first wireless link serving as the current network link meets the first preset condition comprises:
detecting signal strength of the first wireless link; and
when the signal strength of the first wireless link is less than or equal to a first preset threshold value, determining that the first wireless link meets the first preset condition.

3. The method according to claim 1, wherein determining that the second wireless link meets the second preset condition comprises:
detecting the signal strength of the first wireless link and signal strength of the second wireless link; and
when a difference between the signal strength of the first wireless link and the signal strength of the second wireless link is larger than a second preset threshold value, determining that the second wireless link meets the second preset condition.

4. The method according to claim 1, wherein determining that the second wireless link meets the second preset condition comprises:
detecting the signal strength and link performance of the first wireless link and the signal strength and link performance of the second wireless link; and
when a difference between the signal strength of the first wireless link and the signal strength of the second wireless link is larger than a second preset threshold value and the link performance of the second wireless link is higher than the link performance of the first wireless link, determining that the second wireless link meets the second preset condition.

5. The method according to claim 1, wherein establishing the second wireless link with the second wireless hotspot through the second wireless module comprises:
controlling the second wireless module to operate to automatically load configuration information and perform hotspot scanning; and
when the second wireless hotspot matched with the configuration information is scanned, attempting to connect the second wireless hotspot, and after successful connection, establishing the second wireless link.

6. The method according to claim 1, wherein detecting the stability of the second wireless link comprises:
when the second wireless link is kept stable for a preset time length, controlling the first wireless link to be disconnected, and stopping operation of the first wireless module;
when the second wireless link is not kept stable for the preset time length and a link disconnection occurs to the second wireless link, controlling the current network link to be handed over from the second wireless link back to the first wireless link; and
when the second wireless link is not kept stable for the preset time length and the link disconnection does not occur to the second wireless link, continuing detecting the stability of the second wireless link until the stability is kept for the preset time length.

7. A mobile terminal, operating in a double-chip manner and comprising:
a memory storing processor-executable instructions;
a first wireless module and a second wireless module, wherein the first wireless module and the second wireless module are implemented through double chips, the first wireless module and the second wireless module each being a Wi-Fi chip; and
a processor arranged to execute the stored processor-executable instructions to perform steps of:
when it is determined that a first wireless link serving as a current network link meets a first preset condition, establishing a second wireless link with a second wireless hotspot through the second wireless module, and keeping the first wireless link connected, wherein the first wireless link is established by the mobile terminal with a first wireless hotspot through the first wireless module; and
when it is determined that the second wireless link meets a second preset condition, handing over the current network link from the first wireless link to the second wireless link so that a network is accessed through the second wireless link to implement seamless handover between wireless hotspots through the double-chip manner;
wherein the processor is further configured to: after the current network link is handed over from the first wireless link to the second wireless link, detect stability of the second wireless link.

8. The mobile terminal according to claim 7, wherein determining that the first wireless link serving as the current network link meets the first preset condition comprises:
detecting signal strength of the first wireless link; and
when the signal strength of the first wireless link is less than or equal to a first preset threshold value, determining that the first wireless link meets the first preset condition.

9. The mobile terminal according to claim 7, wherein determining that the second wireless link meets the second preset condition comprises:
- detecting the signal strength of the first wireless link and signal strength of the second wireless link; and
- when a difference between the signal strength of the first wireless link and the signal strength of the second wireless link is larger than a second preset threshold value, determining that the second wireless link meets the second preset condition.

10. The mobile terminal according to claim 7, determining that the second wireless link meets the second preset condition comprises:
- detecting the signal strength and link performance of the first wireless link and the signal strength and link performance of the second wireless link; and
- when a difference between the signal strength of the first wireless link and the signal strength of the second wireless link is larger than a second preset threshold value and the link performance of the second wireless link is higher than the link performance of the first wireless link, determining that the second wireless link meets the second preset condition.

11. The mobile terminal according to claim 7, wherein establishing the second wireless link with the second wireless hotspot through the second wireless module comprises:
- controlling the second wireless module to operate to automatically load configuration information and perform hotspot scanning; and
- when the second wireless hotspot matched with the configuration information is scanned, attempting to connect the second wireless hotspot, and after successful connection, establishing the second wireless link.

12. The mobile terminal according to claim 7, wherein the processor is arranged to execute the stored processor-executable instructions to further perform a step of:
- when the second wireless link is kept stable for a preset time length, controlling the first wireless link to be disconnected, and stopping operation of the first wireless module;
- when the second wireless link is not kept stable for the preset time length and a link disconnection occurs to the second wireless link, controlling the current network link to be handed over from the second wireless link back to the first wireless link; and
- when the second wireless link is not kept stable for the preset time length and the link disconnection does not occur to the second wireless link, controlling the detection module to continue detecting the stability of the second wireless link until the stability is kept for the preset time length.

13. A non-transitory computer-readable storage medium having stored thereon a set of instructions arranged to execute a wireless hotspot handover method, applied to a mobile terminal operating in a double-chip manner and comprising a first wireless module and a second wireless module, wherein the first wireless module and the second wireless module are implemented through double chips, the first wireless module and the second wireless module each being a Wi-Fi chip, the method comprising:
- when it is determined that a first wireless link serving as a current network link meets a first preset condition, establishing a second wireless link with a second wireless hotspot through the second wireless module, and keeping the first wireless link connected, wherein the first wireless link is established by the mobile terminal with a first wireless hotspot through the first wireless module; and
- when it is determined that the second wireless link meets a second preset condition, handing over the current network link from the first wireless link to the second wireless link so that a network is accessed through the second wireless link to implement seamless handover between wireless hotspots through the double-chip manner;

the method further comprising:
- after the current network link is handed over from the first wireless link to the second wireless link, detecting stability of the second wireless link.

14. The non-transitory computer-readable storage medium according to claim 13, wherein determining that the first wireless link serving as the current network link meets the first preset condition comprises:
- detecting signal strength of the first wireless link; and
- when the signal strength of the first wireless link is less than or equal to a first preset threshold value, determining that the first wireless link meets the first preset condition.

15. The non-transitory computer-readable storage medium according to claim 13, wherein determining that the second wireless link meets the second preset condition comprises:
- detecting the signal strength of the first wireless link and signal strength of the second wireless link; and
- when a difference between the signal strength of the first wireless link and the signal strength of the second wireless link is larger than a second preset threshold value, determining that the second wireless link meets the second preset condition.

16. The non-transitory computer-readable storage medium according to claim 13, wherein determining that the second wireless link meets the second preset condition comprises:
- detecting the signal strength and link performance of the first wireless link and the signal strength and link performance of the second wireless link; and
- when a difference between the signal strength of the first wireless link and the signal strength of the second wireless link is larger than a second preset threshold value and the link performance of the second wireless link is higher than the link performance of the first wireless link, determining that the second wireless link meets the second preset condition.

17. The non-transitory computer-readable storage medium according to claim 13, wherein establishing the second wireless link with the second wireless hotspot through the second wireless module comprises:
- controlling the second wireless module to operate to automatically load configuration information and perform hotspot scanning; and
- when the second wireless hotspot matched with the configuration information is scanned, attempting to connect the second wireless hotspot, and after successful connection, establishing the second wireless link.

18. The non-transitory computer-readable storage medium according to claim 13, wherein the method further comprises:
- when the second wireless link is kept stable for a preset time length, controlling the first wireless link to be disconnected, and stopping operation of the first wireless module;

when the second wireless link is not kept stable for the preset time length and a link disconnection occurs to the second wireless link, controlling the current network link to be handed over from the second wireless link back to the first wireless link; and when the second wireless link is not kept stable for the preset time length and the link disconnection does not occur to the second wireless link, continuing detecting the stability of the second wireless link until the stability is kept for the preset time length.

19. A wireless hotspot handover method, applied to a mobile terminal operating in a double-chip manner and comprising a first wireless module and a second wireless module, wherein the first wireless module and the second wireless module are implemented by a manner of simulating double chips on a single chip, the method comprising:

when it is determined that a first wireless link serving as a current network link meets a first preset condition, establishing a second wireless link with a second wireless hotspot through the second wireless module, and keeping the first wireless link connected, wherein the first wireless link is established by the mobile terminal with a first wireless hotspot through the first wireless module; and when it is determined that the second wireless link meets a second preset condition, handing over the current network link from the first wireless link to the second wireless link so that a network is accessed through the second wireless link to implement seamless handover between wireless hotspots through the double-chip manner;

the method further comprising:

after the current network link is handed over from the first wireless link to the second wireless link, detecting stability of the second wireless link.

20. The method according to claim 19, wherein determining that the first wireless link serving as the current network link meets the first preset condition comprises:

detecting signal strength of the first wireless link; and when the signal strength of the first wireless link is less than or equal to a first preset threshold value, determining that the first wireless link meets the first preset condition.

21. The method according to claim 19, wherein determining that the second wireless link meets the second preset condition comprises:

detecting the signal strength of the first wireless link and signal strength of the second wireless link; and when a difference between the signal strength of the first wireless link and the signal strength of the second wireless link is larger than a second preset threshold value, determining that the second wireless link meets the second preset condition.

22. The method according to claim 19, wherein determining that the second wireless link meets the second preset condition comprises:

detecting the signal strength and link performance of the first wireless link and the signal strength and link performance of the second wireless link; and when a difference between the signal strength of the first wireless link and the signal strength of the second wireless link is larger than a second preset threshold value and the link performance of the second wireless link is higher than the link performance of the first wireless link, determining that the second wireless link meets the second preset condition.

23. The method according to claim 19, wherein establishing the second wireless link with the second wireless hotspot through the second wireless module comprises:

controlling the second wireless module to operate to automatically load configuration information and perform hotspot scanning; and when the second wireless hotspot matched with the configuration information is scanned, attempting to connect the second wireless hotspot, and after successful connection, establishing the second wireless link.

24. The method according to claim 19, wherein detecting the stability of the second wireless link comprises:

when the second wireless link is kept stable for a preset time length, controlling the first wireless link to be disconnected, and stopping operation of the first wireless module;

when the second wireless link is not kept stable for the preset time length and a link disconnection occurs to the second wireless link, controlling the current network link to be handed over from the second wireless link back to the first wireless link; and when the second wireless link is not kept stable for the preset time length and the link disconnection does not occur to the second wireless link, continuing detecting the stability of the second wireless link until the stability is kept for the preset time length.

* * * * *